United States Patent [19]
Osborne

[11] Patent Number: 6,088,588
[45] Date of Patent: Jul. 11, 2000

[54] METHOD AND WIRELESS TERMINAL FOR MONITORING COMMUNICATIONS AND PROVIDING NETWORK WITH TERMINAL OPERATION INFORMATION

[75] Inventor: Greg Osborne, Nepean, Canada

[73] Assignee: Nortel Networks Corporation, Montreal, Canada

[21] Appl. No.: 08/827,024

[22] Filed: Mar. 25, 1997

[51] Int. Cl.[7] ............................. H04Q 7/32; H04Q 7/34
[52] U.S. Cl. ..................... 455/425; 455/418; 455/419; 455/423
[58] Field of Search ...................... 455/418, 419, 455/423, 406, 425; 379/63; 370/94.1

[56] References Cited

U.S. PATENT DOCUMENTS

| | | | |
|---|---|---|---|
| 4,415,770 | 11/1983 | Kai et al. ............................... | 179/2 |
| 4,487,101 | 12/1984 | Ellen ...................................... | 84/462 |
| 4,622,438 | 11/1986 | Shimizu et al. ........................ | 379/63 |
| 4,704,734 | 11/1987 | Menich et al. ......................... | 455/33 |
| 4,788,711 | 11/1988 | Nasco, Jr. .............................. | 455/404 |
| 5,027,427 | 6/1991 | Shimizu ................................. | 455/67 |
| 5,031,204 | 7/1991 | McKernan ............................. | 379/63 |
| 5,095,500 | 3/1992 | Tayloe et al. .......................... | 379/32 |
| 5,425,076 | 6/1995 | Knippelmier ......................... | 379/27 |
| 5,469,494 | 11/1995 | Perez et al. ............................ | 375/27 |
| 5,481,588 | 1/1996 | Rickli et al. ........................... | 379/32 |
| 5,490,288 | 2/1996 | Wiatrowski ........................... | 455/54.1 |
| 5,553,076 | 9/1996 | Behtash et al. ........................ | 370/95.3 |
| 5,673,252 | 9/1997 | Johnson et al. ....................... | 370/94.1 |
| 5,694,451 | 12/1997 | Arinell .................................. | 379/34 |

FOREIGN PATENT DOCUMENTS

| | | |
|---|---|---|
| 0720407 | 7/1996 | European Pat. Off. . |
| 0734193 | 9/1996 | European Pat. Off. . |
| WO 96/34501 | 10/1996 | WIPO . |
| WO 96/38012 | 11/1996 | WIPO . |

OTHER PUBLICATIONS

DECT—Meβtechnik und Anwendung Funkshau, vol. 65, No. 26, Dec. 10,1993, pp. 68–71, XP000421070.

Patent Abstract of Japan, JP 02 134929, (NEC Corp.), May 23, 1990.

Patent Abstract of Japan, vol. 014, No. 371 (E–0963), Aug. 10, 1990.

*Primary Examiner*—Daniel S. Hunter
*Assistant Examiner*—Alan T. Gantt
*Attorney, Agent, or Firm*—Jeffrey M. Measures

[57] ABSTRACT

A wireless terminal monitors its communications with a wireless network in order to provide the network with performance information. The terminal monitors its own operations and messages, or expected messages from the network, and stores information as to the success or failure of these various events. Performance information, for example, bit error rate and receive signal strength is also stored. The terminal is also capable of performing transmission path quality tests, for example, loop backs. The terminal can transmit information to a network at regular time periods or as a response to a request from the network.

8 Claims, 7 Drawing Sheets

METHOD AND WIRELESS TERMINAL FOR MONITORING COMMUNICATIONS AND PROVIDING NETWORK WITH TERMINAL OPERATION INFORMATION

FIELD OF THE INVENTION

The present invention relates to wireless terminals operating in a wireless network. It also relates to operations, administration, and maintenance of such a network.

Background to the Invention

Wireless telecommunication networks are known to have inconsistent performance due to a variety of factors. These factors include the correct operation of the terminal and infrastructure equipment, radio propagation variation, and interference. These factors are considered during the initial planning and installation of the network infrastructure. However, these factors usually change over time.

Consequently, it is important for a service provider to monitor network performance and properly diagnose problems in network coverage in order to provide suitable service to subscribers. This is generally described as Operations, Administration, and Maintenance (hereafter OAM).

Various prior art systems have described diagnosis techniques for measuring network performance. Some of these systems have involved the use of dedicated test equipment, which is moved to various locations to test network performance at these locations. Such systems have difficulty measuring performance at all locations supported by the network, and can only measure performance at a specific location during the time period in which the test equipment is at that location.

Other systems monitor network performance as viewed from the network base stations on a regular basis. In these cellular systems, the network OAM ends at the cell site. Performance of the system is measured with statistical information of mobile activity. System diagnostics are run with test equipment adjunct to the base station. These systems provide useful monitoring of conditions from the base stations' perspective, but are not capable of monitoring conditions from a terminal's perspective. This presents problems as asymmetrical conditions often occur, which can significantly degrade a terminal's reception of communications from its basestation, without necessarily degrading the basestation's reception of communications from the terminal. Thus a user may experience unacceptable conditions which the service provider can not easily detect.

Such OAM is especially important for fixed wireless access (FWA) systems. A mobile terminal will typically experience poor communications ( e.g., from fading, or interference) for a short duration before the terminal is moved to a better location. This is especially true for some fading conditions, where moving the terminal a relatively small distance can improve reception quality. However a FWA terminal is unlikely to be moved, and thus will continue to experience poor communications until the conditions causing the problem change.

Thus, there exists a need for a wireless terminal and method for providing OAM information to the network from a wireless terminal for diagnosing potential problems in network performance from the terminal's perspective.

SUMMARY OF THE INVENTION

An object of the present invention is to provide a wireless terminal and method which provides the wireless network with information about network performance. Advantageously, a terminal which provides wireless services to a user can provide OAM information to the network.

One aspect of the invention provides the ability to capture performance data at the subscriber terminal, and pass the information back to the network, where it can be interpreted and acted upon. This information can be used remotely for system performance analysis. This advantageously provides service providers with advanced diagnostic capabilities to proactively support and trouble shoot operation of the network.

These features are designed to offer superior network performance (e.g., voice quality, grade of service, capacity, coverage, etc.) and better customer service. Furthermore, this can reduce costs associated with service calls and network monitoring requiring a technician with dedicated test equipment.

In accordance with a broad aspect of the present invention there is provided a method of providing a wireless network with performance information from a wireless terminal comprising the steps of:

a) the terminal monitors its communications with the network;

b) the terminal stores information relating to its communications for subsequent transmission to the network; and c) the terminal transmits the stored information to the network in response to a condition.

In monitoring its communications with the network, the terminal monitors the air interface for call connection events and also makes regular measurements of network performance (e.g., bit error rate (BER) and received signal strength (RSS) logs measured at the terminal). The terminal then maintains and updates records relating to these call connection events and network performance. These records can comprise simple counters of event failures for each parameter monitored by the terminal. Alternatively these records can include more detailed information relating to each parameter, e.g., a call log including the time and date, channel, and duration of any failure, and events prior to the failure. This information can later be retrieved by the network. This information is useful as it serves as an indication of the terminal's view of the system performance.

The condition which prompts the terminal to transmit its stored information can involve a request from the network; the expire of a predetermined time period from the last transmission; the occurrence of predetermined number of failures, etc. Alternatively, depending on the air interface involved, the information can be transmitted during a call.

According to one aspect of the invention, the terminal can receive a request from the network to transmit stored performance information. In addition to transmitting stored information, the network can instruct the terminal to perform transmission path quality tests, for example by enabling or disabling loop-backs of voice or data for path continuity testing.

In addition to monitoring network performance, the terminal can also carry out self monitoring of its own systems, and report any failures to the network. Advantageously, this provides for the early detection of CPE (Customer Premise Equipment) problems. The service provider can in turn arrange to fix a problem before the subscriber's service is seriously effected; potentially before the customer complains, or even becomes aware of the problem.

According to a another aspect of the invention there is provided a terminal comprising a communications interface for communicating with a communications network;

memory; and a controller for controlling said terminal, said controller adapted to monitor terminal and network operations and store the results in said memory for subsequent transmission by said communications interface to said communications network.

BRIEF DESCRIPTION OF THE DRAWINGS

The present invention, together with further objects and advantages thereof will be further understood from the following description of a preferred embodiment, with reference to the drawings in which:

FIGS. 2 through 6 illustrate the process steps carried out by the terminal according to a preferred embodiment of the invention.

DETAILED DESCRIPTION OF THE PREFERRED EMBODIMENTS

The preferred embodiment of the present invention will be described with respect to its application within a subscriber unit such as the fixed wireless access terminal shown in FIG. 1. The preferred embodiments will also be described for IS54-B, TDMA-3. It should be appreciated by a person skilled in the art that this example is used for the purposes of illustration and the invention is also applicable to other systems and can be implemented in other types of subscriber units or even in a mobile terminal.

Figure 1:
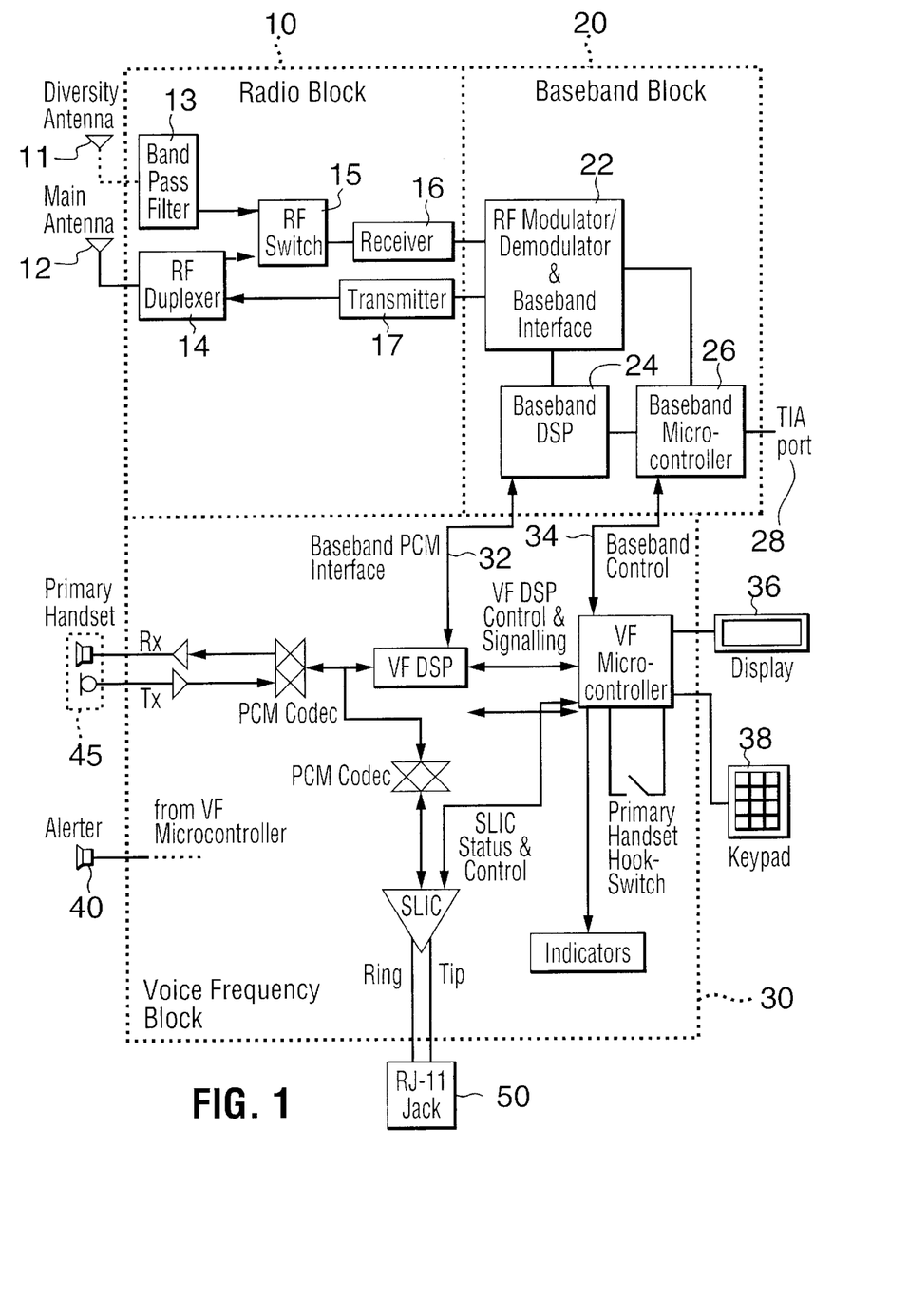
FIG. 1 is a schematic block diagram of a wireless access terminal incorporating a preferred embodiment of the present invention.

In FIG. 1 the terminal comprises a radio block 10, a baseband block 20 and a voice frequency block 30. There are two interfaces between the baseband block 20, and the voice frequency block 30. The first interface called the PCM interface 32 comprises the digitized voice frequency pulse code modulation (PCM) transmit and receive signals, while the second interface is a bi-directional serial communications interface 34. The radio block 10, and the baseband block 20, provide the conversion between the radio frequency and digitized voice frequency signals. The baseband block 20 is also responsible for handling the protocols associated with the RF link.

In FIG. 1, the terminal is a fixed wireless subscriber unit which acts as a self contained terminal, as well as includes an interface for providing telephony services to standard telephony devices. As states, this configuration is not essential to the invention. As shown, the voice frequency block 30 includes a primary user interface which includes a display 36, a keypad 38, an alerter 40 which produces an audio alert (e.g., ringing) and an indicator which provides visual alerts (e.g., a light indicator indicating, for example, that an extension is off-hook or that an incoming call has been received), and a primary handset 45. The voice frequency block 30 also includes a secondary user interface including a subscriber line interface circuit (SLIC) and a RJ-11 jack 50 which acts as an extension jack for a standard analog telephony devices. Note that an additional data jack can be supported. In this configuration, the voice frequency block also contains its own microcontroller and DSP.

Not shown is a suitable DC power source. This can comprise a battery, or a suitable AC power adapter, or preferably a combination of the two where ordinarily power is provided from an AC main with battery power as a backup.

In FIG. 1 the radio block 10 is shown to include a main antenna 12 connected to a radio frequency duplexer 14 which is in turn connected to a transmitter block 17 and a RF switch 15. RF switch 15 is connected to a receiver block 16 and selects between an input from the RF duplexer 30 or from an input from a bandpass filter 13 which is in turn connected to a diversity antenna 11.

Both the receiver 15 and transmitter 17 of the radio block 10 are connected to the RF modulator/demodulator and baseband interface block 22 of the baseband block 20. The baseband block 20 also includes a suitable baseband Digital Signal Processor (DSP) 24 and a suitable baseband controller 26 which is in turn connected to a TIA port 28. The TIA (test interface adapter) port is used to communicate with a data terminal (e.g., a personal computer) using a TIA unit in order to set the terminal into various states and carry out commands and/or procedures either for testing or verification. The Texas Instruments TCM 4300 ARCTIC (Advanced RF Cellular Telephone Interface Circuit) chip is suitable for block 22. The baseband controller 26 comprises a suitable microprocessor along with associated memory (e.g. RAM, ROM, EEPROM).

Most of the communications between the radio and baseband blocks takes place via the baseband interface 22. However, control links, not shown, allow the baseband microcontroller 26 to control the RF switch 15, the receiver 16 and the transmitter 17.

In operation, a communication signal is received at both the main antenna 12 and the diversity antenna 11, where the signal is suitably filtered either by the RF duplexer 14 or the band pass filter 13 respectively. The RF switch 15 determines which of the signals, are down converted by the receiver block 16 based on a suitable diversity selection process.

The selected signal is down converted to a suitable IF signal by the receiver block 16. The receiver block 16 also measures the received signal strength and sends a message to the RF demodulator and baseband interface block 22 as to the received signal strength indication (RSSI) as is known in the art. The RSSI is then sent to the baseband microcontroller 26. The baseband DSP 24 also determines the bit error rate (BER) which is also forwarded to the baseband microcontroller. The baseband controller 26 is used to process layers 1 to 3 of the communication protocol stack, to manage the control of the RF radio block 10 and the baseband block 20, and also carries out user interface functions. In this embodiment, the OAM monitoring, testing, and storing, along with control of the transmission of stored information, is carried out by the baseband controller, according to software programs stored in its associated memory. The process steps carried out according to these software programs will be described with reference to FIGS. 2–6.

Figure 2:
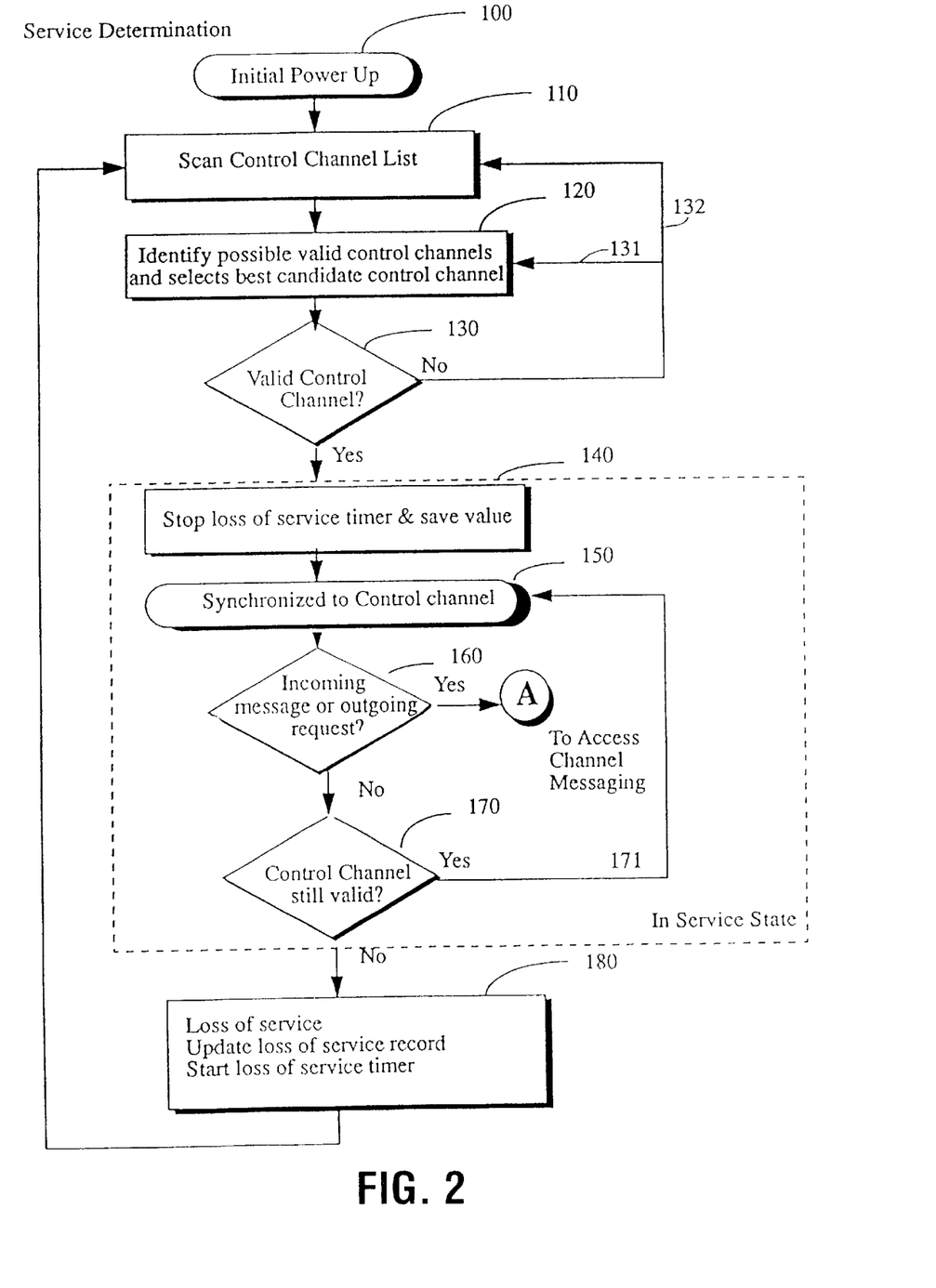
FIG. 2 is a flow chart illustrating the steps carried out by the terminal in determining whether service is available, and also illustrates the in-service state according to a preferred embodiment of the invention.

FIG. 2 is a flowchart illustrating the steps carried out by the baseband microcontroller of the terminal to provide the loss of service OAM diagnostic, according to one embodiment of the invention. This figure also represents the steps carried out while the terminal is idle (i.e., not in the middle of a call).

On initial power up 100 the terminal functions and variables are initialized. Optionally, but not shown, a loss of service timer, which is normally started at step 180, can be started during initialization, in order verify service is available upon initialization. The terminal then proceeds to scan the defined control channel set 110 to identify potential active channels 120. The criteria used is based typically on RSS (received signal strength) but could be based on other criteria. The channel with the highest RSS is selected as the control channel to attempt to achieve data synchronization.

The candidate control channel selected in steps 110 and 120 is then validated 130. In IS-54-B (April 1992, EIA/TIA Interim Standard, Cellular System Dual-Mode Mobile Station—Base Station Compatibility Standard) this involves decoding of valid Overhead Message Train (OMT) data from the selected control channel. If the data is successfully decoded, the channel is declared valid and the mobile is now in sync (or locked) to the control channel. If the validity check fails the terminal returns to state 110 or 120.

According to IS-54-B, in the event the validity check fails, the second strongest RSS channel as measured in the last pass through task 110 is automatically selected as the next candidate channel. Path 131 is taken in this case. If the second strongest RSS channel also fails the validity check, IS-54B defines path 132 which provides for a rescan of the control channel set. In some circumstances the terminal may switch to another control channel set (e.g., the control channel set provided by an alternative access provider).

The loop defined by steps 110, 120, and 130 and feedback paths 131 and 132 define the out-of-service state.

As long as the terminal can validly decode the Forward control channel (FOCC) data word synchronization pattern, the terminal is considered to be in-service. If the terminal is in-service, the terminal proceeds to step 140, wherein the terminal disables the loss of service timer and stores the duration to memory. After the control channel is validated, the terminal is then synchronized to the selected control channel 150, as is known in the art. Steps 150, 160, 170 and path 171 define the in-service loop. In this state the terminal has valid control channel reception from the base station, and can receive incoming calls or may attempt out-going calls.

Figure 3:
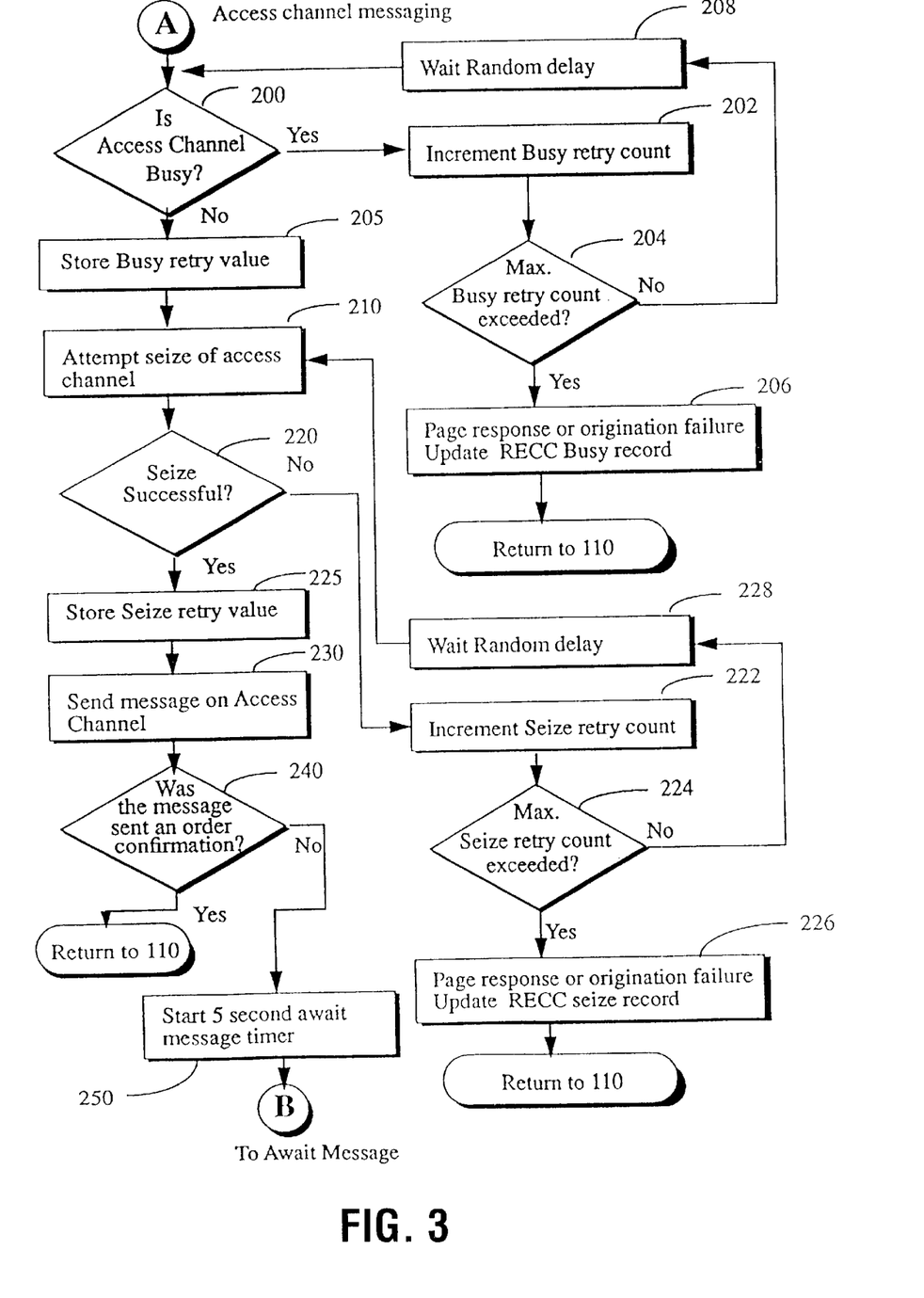
FIG. 3 is a flowchart illustrating the access channel message process steps according to the preferred embodiment of a invention.

After control channel synchronization, the terminal then waits until an order, registration, or origination event occurs 160. If such an event is detected, the terminal needs to access the access channel in order to send the appropriate message to the base station. FIG. 3 illustrates the process the terminal follows to successfully send the message via the access channel to the base station. Meanwhile, while the terminal waits for such an event, the terminal periodically (e.g., once every frame) verifies the control channel(CCH) is still valid 170. A criteria for loss of CCH is successive decoding failure of the Forward control channel (FOCC) data word synchronization pattern.

Step 180 is executed on the loss of the control channel which implies a loss of service has occurred. Once the loss of service is determined, the loss of service record is updated and the loss of service timer started. The terminal than attempts to lock/sync to another control channel 110. The loss of service timer runs until a valid channel is found 140.

As stated, once an order, registration, or origination event occurs 160, the terminal proceeds to the steps shown in FIG. 3, wherein the terminal determines if the access channel is busy 200. This determination is made in accordance with IS-54-B, which defines a collision avoidance protocol via busy/idle bits in the forward control channel. If the terminal detects that the access channel is busy, it increments a busy retry counter 202. It then determines if its maximum busy retry count has been exceeded, by comparing said counter with a predetermined threshold 204.

If the maximum busy retry count is exceeded, 204, the mobile's messaging attempt has failed. In this case, the terminal updates a reverse control channel busy record 206. After this failure, the terminal returns to process 110 to rescan the control channel set.

If the maximum busy retry count threshold is not exceeded, the terminal waits a random delay interval 208, and then attempts to reread the access channel to see if it is now idle 200.

If the terminal determines the access channel is idle 200, the terminal is now ready to attempt to seize the access channel. First, the terminal updates the appropriate record, for example, by storing the value of the busy retry counter 205. Note that this value will be zero if the access channel was idle on the terminal's first attempt. After the terminal stores its record, the terminal resets the value of the counter to zero for the next access attempt. Next, the terminal begins a transmission on the access channel 210, according to the IS54B seizure process. The terminal determines if the seize is successful 220 by monitoring the forward control channel for the presence of a signal from the base station indicating that base station has seen the terminal's transmission (e.g., the busy/idle bit toggling to the busy state during the time period defined by IS54B). In this example, the transmission is terminated before completion if the busy/idle bit does not toggle within the proper time period.

If the seize is unsuccessful the terminal increments the seize retry counter as shown in 222. The terminal then compares the seize retry counter with the maximum seize retry limit 224. If the retry count exceeds the maximum retry count limit, the seize attempt fails. The terminal then updates a reverse control channel seize record 226, and then returns to scanning for control channels 110. If the maximum retry count is not exceeded, the terminal waits a random delay 228, and proceeds with another transmission attempt 210.

If the seize is successful the terminal updates a seize retry record for example, by storing the value of the seize retry counter. The terminal then sends the appropriate message (e.g., a registration, order confirmation, page response, or origination message, depending on the corresponding triggering event 160) to the base station on the access channel 230. As shown in 240 if the message sent is an order confirmation the terminal returns to 110 and a scan of the control channels.

If the message is an origination, a registration, or page response the terminal starts an await message timer, for example a five second timer 250. This starts a five second period during which the terminal awaits a base station response message.

Figure 4:
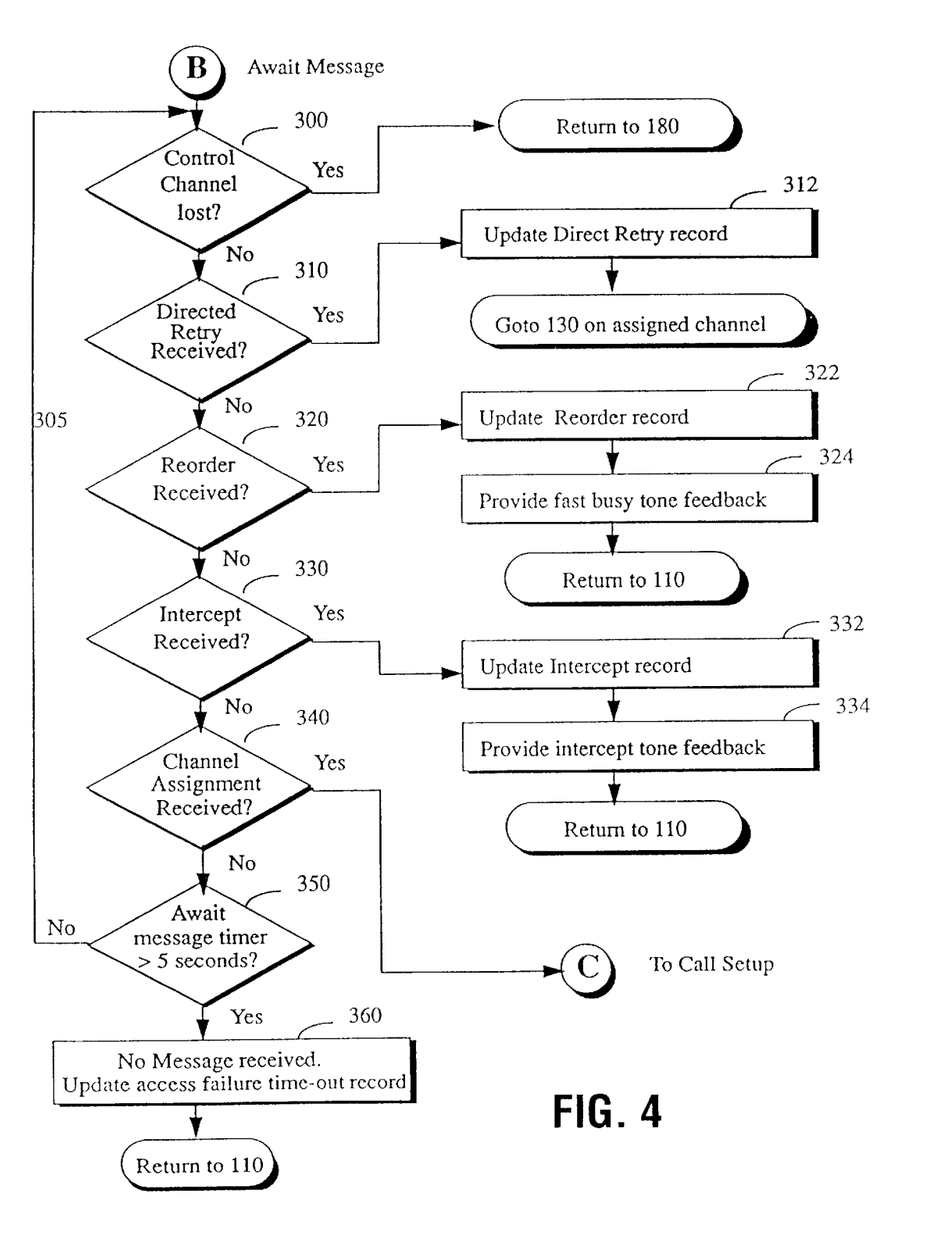
FIG. 4 is a flowchart illustrating the await message process steps carried out by the terminal according to a preferred embodiment of the invention.

The await message flow diagram illustrating the process during this period is shown in FIG. 4. In the await message state the terminal is still actively locked onto the control channel, and monitors the channel for a response message from the base station. During this period, the terminal checks for the occurrence of an event, as shown by the loop 305. For example, the terminal verifies it is still locked to a valid control channel as shown in 300. If the control channel is lost the terminal returns to step 180.

If a directed retry message is received 310, the directed retry record is updated at step 312, which records retry events implemented by the mobile. Terminal processing than returns to step 130 on the assigned control channel defined within the directed retry message.

If a reorder message is received 320, the reorder record is updated 322. In this event, the terminal attempted to make a call, and the call attempt failed. The terminal generates a local fast busy tone for feedback to the user 324. The terminal's processing then returns to 110 and a rescan of the control channels.

If an intercept message is received 330, the terminal's intercept record is updated 332. The terminal then locally generates the intercept tone to provide feedback to the user 334. The terminal then returns to step 110 and a scan of the control channels.

If a channel assignment is received 340, the terminal proceeds to call setup, as described below with reference to FIG. 5.

During the await message state, the await message timer is continually checked 350. If the timer exceeds 5 seconds before one of the above events occurs, the terminal's messaging with the base station is deemed to have failed. The terminal then updates an access failure time-out record 360 and returns to step 110 and a scan of the control channels.

Figure 5:
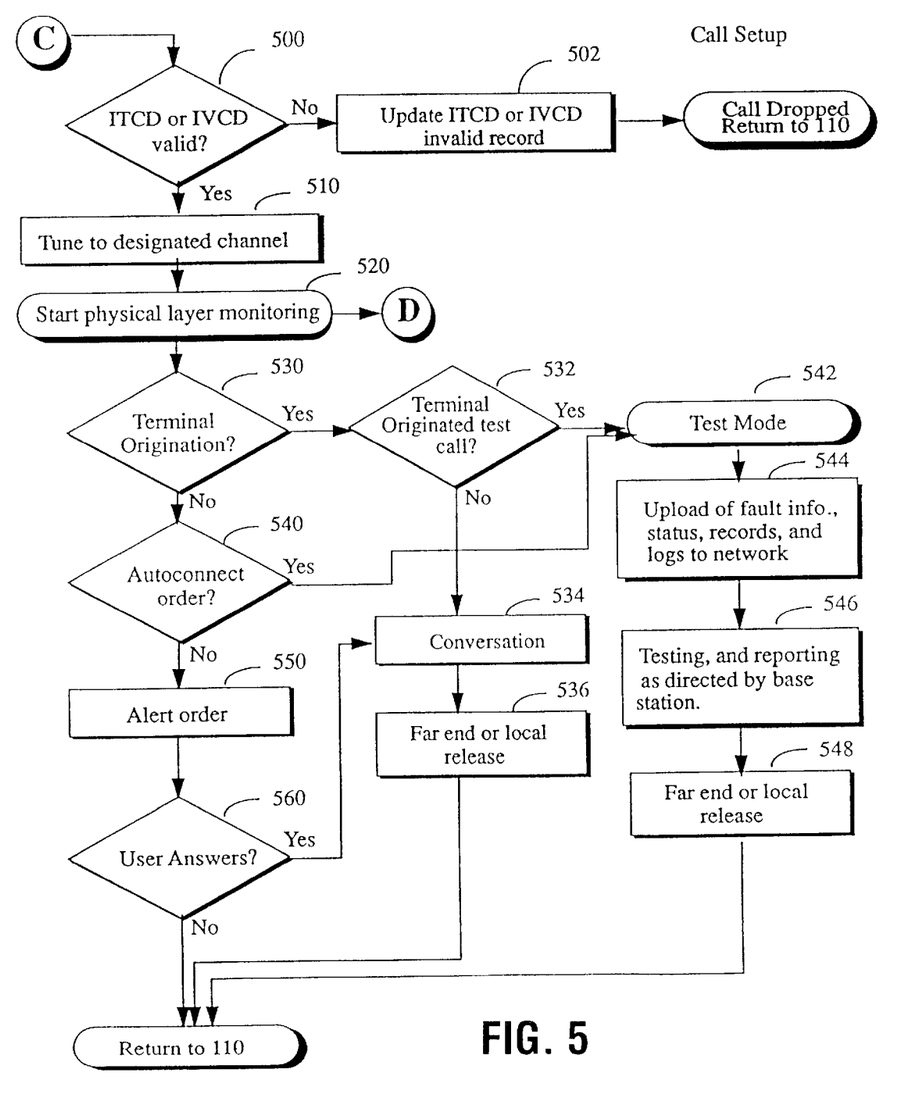
FIG. 5 is a flowchart illustrating the call set-up process steps carried out by the terminal according to a preferred embodiment of the invention.

Referring to the call setup flow chart, FIG. 5, a verification check 500 is made to determine if the channel assignment is valid. This involves an Initial Traffic Channel Designation (ITCD) message verification if it is a digital call, or an Initial Voice Channel Designation (IVCD) message verification if it is an analog call. If the assignment is invalid, e.g., an undefined channel number is assigned (indicative of a network error), the terminal updates the appropriate record 502, and returns to 110.

Figure 6:
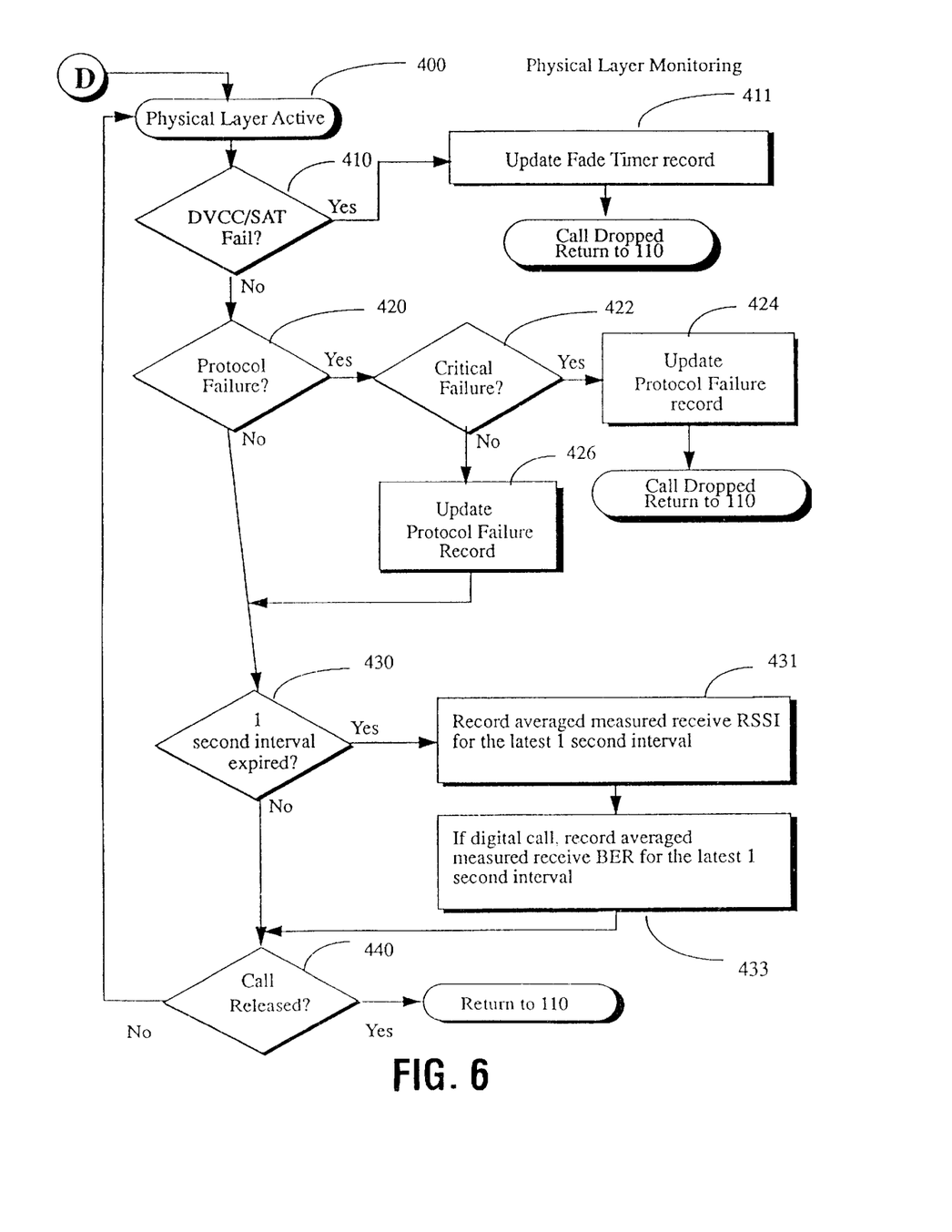
FIG. 6 is a flowchart illustrating the physical layer monitoring process steps carried out by the terminal according to a preferred embodiment of the invention.

If the ITCD or IVCD is valid, the terminal tunes to the designated channel 510, and also starts the physical layer monitoring steps 520. The physical layer monitoring steps start once the terminal to base station RF connection is established and continues while the connection is maintained. FIG. 6 is a flow chart of Physical Layer Monitoring process, which describes the tasks executed by the terminal throughout a call. The process described in FIG. 6 occurs concurrently with the remaining steps described in FIG. 5.

Referring to the Physical Layer Monitoring flow chart, the DVCC/SAT status is checked 410. If the fade timer is exceeded the terminal updates a fade timer record, 411, and the call is dropped. The terminal returns to 110 and scanning the control channels.

The Physical layer monitoring includes the step determining if there is a protocol failure 420, (e.g. a message response is not received from the base station as expected). If a protocol failure occurs, the failure is further classified as critical or not 422. Critical failures include the absence of a Physical Layer control message at the start of a digital call, or the time out of the waiting-for-order timer. In this case the terminal updates a protocol failure record 424, and the call is dropped. The terminal returns to 110 and scans the control channels. If the protocol failure is not critical, e.g., no acknowledgement is received from the base station, the event is recorded 426, but the call is maintained.

When the physical layer is active, the average measured received signal strength (RSS) record is updated periodically, for example, at one second interval, 430. The measured RSS is recorded 431. If the call is digital, the measured bit error rate (BER) is also periodically recorded 433.

The RSS and BER records accumulate across calls or can be transmitted to the network and reset on a per call basis.

Referring back to the call setup flow chart FIG. 5, the physical layer monitoring described above commences once the base to mobile RF connection is established 520. Meanwhile, the terminal proceeds to 530. At 530 the call processing steps branch dependent on if the call was originated by the terminal. If so at 532 there is a further branch if the origination was a terminal originated test call. By test call, we mean a call setup for the purpose of providing information to the network. This can involve actual tests, or simply a transmission of stored records.

If the call was originated by the terminal, but was not a test call, the terminal proceeds to normal call conversation processing 534.

Referring back to the decision made at process step 530, if the call was not terminal originated, i.e., the call originated from the network, the terminal determines whether the incoming call includes an auto connect order message 540. An auto connect order message is a message sent from the network to the terminal, instructing the terminal that the incoming call is a test call. If an auto connect order is received the terminal does not alert the user, but directly enters the test call mode 542 described below without manual intervention. If no auto connect is received the terminal waits for the alert order to begin ringing. A user will now manually answer the phone to move to conversation state 534, or the call will be released after a timeout period.

The terminal enters the test call mode 542 in response to condition being satisfied. This condition includes receiving an autoconnect order message 540 as described above. Other conditions include having one of the OA&M counter values exceed a predefined or remotely downloaded threshold, or on the expiration of specified time period from the last test call, or on a scheduled time basis, in which case the terminal can initiate a test call 532, for example, to a predefined network number associated with a network OAM function. If an appropriate condition is satisfied, the terminal enters the test mode 542. In test call mode, the terminal transmits its stored data, either all of it, or specific records requested by the network 544. Optionally, selective terminal tests 546 can be initiated, stopped and results transmitted to the base station as will be discussed below. Additionally, local hardware status, power and battery status can be determined and transmitted.

Upon completion the test call is released and the terminal returns to 110.

Thus, as discussed, various Call connection events are monitored and information relating to these events is recorded for subsequent transmission to the network. These events include CCH Busy, Reorder, Intercept, directed retries, CCH seize failures, fade timeouts, CCH access timeouts, loss of service, Protocol failures (order timeouts, physical layer timeouts, acknowledgement timeouts), etc., other information, for example, RSSI and BER information can be measured and stored.

Figure 7:
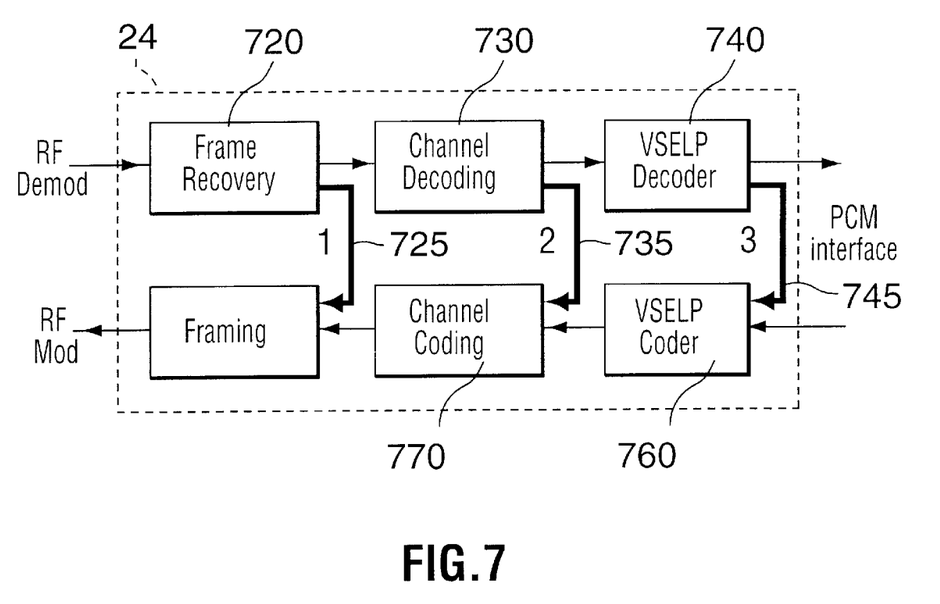
FIG. 7 is a schematic block diagram illustrating various processes carried out by the baseband DSP of the baseband block of FIG. 1 and also illustrates digital loop back tests carried out by the DSP.

Preferably, step 546 includes transmission path quality testing. One such transmission path quality test involves enabling audio loop backs of the transmissions received by the terminal from the basestation. FIG. 7 is a schematic block diagram illustrating various processes carried out by the baseband DSP 24 when operating in digital mode. In operation, an RF demodulated signal is received from the RF modular/demodulator and baseband interface block 22. This signal undergoes a frame recovery process 720. After recovery the signal is subject to a channel decoding process 730 (including deinterleaving and error correction). The next stage is the VSELP Decoder process. This signal is then sent via a transmit buffer to the baseband PCM interface 32. Note that additional DSP functions (not shown) may be carried out. Similarly on the transmit side, the PCM data stream is VSELP coded 760, channel coded through channel coding stage 770 and then framed in a framing stage 780 before being passed to the RF modulator/demodulator 22. These stages are conventional processing stages according to IS54B.

However, in the preferred embodiment the DSP provides for additional loop back tests indicated as 725, 735 and 745. Thus the terminal can be instructed to enable and disable voice loop backs wherein audio data received from the basestation is returned to the basestation. In this embodiment the DSP supports loop back of additional speech data at three possible points. The first loop back point 725 is immediately after frame recovery of the data sequence. The second loop back point 735 is after the channel decoding stage and the third loop back 745 is after the VSELP decoder stage.

These loop backs may be enabled or disabled as part of a test call or they may be enabled or disabled locally via the TIA port 28.

The above description describe digital loop backs. In AMPS mode, a single loop back of the audio signal is implemented by the DSP (not shown).

According to a preferred embodiment of the invention the digital transmission path quality between the terminal and the network also can be tested in the following manner. A network test unit (not shown) and the baseband DSP 24 are provided with compatible pseudo random bit sequence generators. Thus during a test call a pseudo random bit sequence can be transmitted from the network to the terminal. This bit sequence is then analyzed by the terminal for bit errors by comparing the received data with the DSP's internally generated pseudo random bit sequence. Similarly the terminal can generate and transmit such a sequence for reception by the network and analysis by the network test unit. Note According to IS54B, the bit error rate measurement is only calculated on the CLASS 1 bits of the channel encoded speech data, which covers only 77 bits of the full 260 data field. According to a preferred embodiment of the invention the baseband DSP software can interpret the entire date field as part of a pseudo random bit sequence. Thus, the bit error rate on the forward link and reverse link on the whole data field can be measured.

For example the network test unit generates the pseudo random bit sequence replacing the IS-54-B channel encoded data field. The terminal's baseband DSP software detects this pseudo random bit sequence and compares to its internal generation of the pseudo random bit sequence. Bit errors on the forward link data field are counted and stored at the terminal. The bit error count may be report via an air interface message back to the network or read locally.

For reverse link error rate measure, the terminal's baseband DSP software generates and transmits the pseudo random bit sequence. The bit sequence recovery and error counting is performed on the network by the test unit.

This data field BER testing and subsequent test report can be controlled remotely via air interface messages between the base station and terminal during a test call.

According to a preferred embodiment of the invention the quality of the analog transmission path between the terminal and the network also can be tested. To support independent forward link and reverse link testing during an analog call (or during a test call), the terminal is equipped with the ability to generate and detect specified tones. For example, the baseband DSP can include the implementation in software of a 1004 Hz tone and level detector and 1004 Hz tone generator. The DSP implementation of the tone detector and generator is compatible with a Transmission Trunk Test unit connected to the network side of the communications link (not shown). Of course a DSP is not necessary. For example, tone generator and detector circuitry can be used instead.

The forward link test tone is generated at the Transmission Trunk Test unit and passed through the network and air interface link to the terminal receiver. The terminal's baseband DSP terminates the forward link test with its analysis of the tone frequency and level. The tone frequency and level detected at the terminal is then reported back to the network via an air interface message. Alternatively, this data can be read locally. This is useful as the tone frequency and level provide a measure of the performance quality of the forward link.

For the reverse link test the terminal's baseband DSP generates a 1004 Hz test tone of defined level and transmits this (via the network) to the Transmission Trunk Test unit. The Transmission Trunk Test unit then analyzes the tone frequency and level.

The enabling, disabling, and reporting of the tone generation and detection can be controlled remotely via air interface messages to the terminal during a test call.

It should be noted that the above description is not exhaustive. For example not all of the steps carried out by the terminal are shown or described above. Other steps, necessary or desirable for regular operation, can be carried out in conjunction with the above. For example, the above description does not explicitly initialize the counters described above. These counters are reset during normal operation, for example during initialization, or when their value is stored for transmission to the network, or when such a transmission occurs. The counters may also be reset to zero remotely by the base station.

Furthermore, as shown in the FIGS. 2–6, there is a separate counter for each call connection event, and each counter is incremented during operation whenever an event occurs.

Preferably, if sufficient memory and processing is available, a more detailed record, including various additional information, is associated with each event. For example, this information can include the time and date when the event occurred, the control/traffic channel to which the terminal was synchronized, recent RSSI and BER measurements of that channel, and potentially a log of the recent events immediately prior to the event. An indication as to which antenna (e.g., the main antenna 12 or the diversity antenna 11) was selected can also be included. This call log represents an effective "trace" of the steps carried out by the terminal (and also measurements made) prior to an event.

As another alternative, it should be noted that the above description illustrates operation wherein stored information is only transmitted to the network during a test call. However, this is not necessarily the case. During a normal call, stored OAM information can be transmitted, for example, in the form of IS-54-B's FACCH or SACCH messages. Similarly, the base station can initiate tests, as described above, during a call.

Furthermore, preferably, these OA&M records can be downloaded locally at the terminal via a serial interface or through the keypad LCD interface.

Numerous modifications, variations and adaptations may be made to the particular embodiments of the invention described above without departing from the scope of the invention, which is defined in the claims.

What is claimed is:

1. A method of providing a wireless network with performance information from a wireless terminal comprising the steps of:
    a) the terminal monitors its communications with the network;
    b) the terminal stores information relating to its communications for subsequent transmission to the network;
    c) the terminal transmits the stored information to the network in response to receiving a request for information from said network; and
    d) performing transmission path quality test in response to the terminal receiving said request wherein said step of performing transmission path quality tests comprises the steps of generating and transmitting a pseudo random bit sequence for evaluation by the network, and analyzing a pseudo random bit sequence received by said network.

2. A terminal comprising:
    a communications interface for communicating with a communications network;
    memory; and
    a controller adapted to carry out the method as claimed in claim 1.

3. A method of providing a wireless network with performance information from a wireless terminal comprising the steps of:
    a) the terminal monitors communications with the network for a test call request;
    b) upon receipt of a test call request the terminal enters a test mode, wherein said terminal performs transmission path quality tests; and
    c) transmits the results to said network, wherein transmission path quality tests are selected from the group comprising:
    enabling digital audio loop backs;
    enabling analog audio loop backs;
    analyzing a received analog tone transmitted by said network;
    transmitting an analog tone to said network for analysis by said network;
    generating a pseudorandom bit sequence, and transmitting said bit sequence to the network for analysis; and
    receiving a pseudorandom bit sequence from said network, and comparing said received pseudorandom bit sequence with an internally generated pseudorandom bit sequence for bit errors.

4. A terminal comprising:
    a communications interface for communicating with a communications network;
    memory; and
    a controller adapted to carry out the method as claimed in claim 3.

5. A method of providing a wireless network with performance information from a wireless terminal comprising the steps of:
    a) the terminal monitors its communications with the network;
    b) the terminal stores information relating to its communications for subsequent transmission to the network;
    c) the terminal transmits the stored information to the network in response to a condition; and
    d) performing transmission path quality tests in response to said condition being satisfied wherein said step of performing transmission path quality tests comprises the steps of generating and transmitting a pseudo random bit sequence for evaluation by the network, and analyzing a pseudo random bit sequence received by said network.

6. A terminal comprising:
    a communications interface for communicating with a communications network;
    memory; and
    a controller adapted to carry out the method as claimed in claim 5.

7. The method as claimed in claim 5 wherein said condition includes any of:
    i) the expiry of a predetermined time period from the last transmission;
    ii) the occurrence of a predetermined number of failures; and
    iii) a monitored parameter exceeds a threshold.

8. A terminal comprising:
    a communications interface for communicating with a communications network;
    memory, and
    a controller adapted to carry out the method as claimed in claim 7.

* * * * *